(12) United States Patent  (10) Patent No.: US 7,975,744 B2
Johnson  (45) Date of Patent: Jul. 12, 2011

(54) HIGH-THROUGHPUT BOND TOOL

(75) Inventor: Brad Johnson, Pheonix, AZ (US)

(73) Assignee: Suss MicroTec Inc., Waterbury Center, VT (US)

(*) Notice: Subject to any disclaimer, the term of this patent is extended or adjusted under 35 U.S.C. 154(b) by 1109 days.

(21) Appl. No.: 11/334,059

(22) Filed: Jan. 18, 2006

(65) Prior Publication Data

US 2006/0191640 A1 Aug. 31, 2006

Related U.S. Application Data

(60) Provisional application No. 60/644,806, filed on Jan. 18, 2005.

(51) Int. Cl.
*B32B 37/00* (2006.01)
(52) U.S. Cl. ............... 156/382; 156/581; 156/583.1; 156/583.3
(58) Field of Classification Search .......... 156/382, 156/537, 580, 581, 583.1, 583.3
See application file for complete search history.

(56) References Cited

U.S. PATENT DOCUMENTS

| 4,875,966 | A | * | 10/1989 | Perko | 156/580 |
| 4,954,206 | A | * | 9/1990 | Voss | 156/537 |
| 5,641,371 | A | * | 6/1997 | Sanko | 156/228 |
| 5,942,089 | A | | 8/1999 | Sproud et al. | 204/192.13 |
| 6,481,482 | B1 | * | 11/2002 | Shimotomai | 156/366 |
| 2004/0040659 | A1 | | 3/2004 | Hasper | 156/345.24 |
| 2004/0253473 | A1 | | 12/2004 | Weekes et al. | 428/595 |

* cited by examiner

*Primary Examiner* — James Sells
(74) *Attorney, Agent, or Firm* — Perman & Green, LLP

(57) ABSTRACT

A substrate bonding apparatus comprises a platen and a press. The press is movable relative to the platen for pressing at least one substrate stack between the press and platen. In one embodiment, a consumable compliant member is disposed between the press and the platen. In another embodiment, the apparatus further comprises a substrate carrier adapted for holding and carrying more than one substrate stack in and out of the apparatus. A method for bonding substrates is also described.

23 Claims, 3 Drawing Sheets

HIGH-THROUGHPUT BOND TOOL

CROSS-REFERENCE TO RELATED APPLICATIONS

This application claims priority from U.S. Provisional Patent Application No. 60/644,806, filed Jan. 18, 2005, which is incorporated herein by reference in its entirety.

BACKGROUND

1. Field

The present invention relates to substrate processing apparatus and, more particularly, to a substrate bonding tool.

2. Brief Description of Related Developments

Consumers desire ever cheaper electrical and electronic devices. A major part of the cost in producing consumer electrical and electronic devices is the cost of the semiconductor devices that provide the very features that make the electronic devices so desired by consumers. Manufacturers of the semiconductor devices thus continue to seek ways to lessen manufacturing costs of the semiconductors. Increasing manufacturing throughput, thereby reducing unit cost, is one way semiconductor manufacturers seek to achieve their goal. By way of example, various types of semiconductor devices have an architecture formed by bonding more than one substrate or wafer to each other. Conventional bond tools generally perform the bond operation one wafer stack at a time. To improve throughput, some conventional bond tools have a cluster of bond chambers, each of which is capable of bonding a stack of wafers at a time. Though bond cluster tools do provide throughput improvements over non-cluster bond tools, it may be readily realized that conventional bond cluster tools are more costly than non-cluster tools due to the multiplicity of substantially identical components and systems in the cluster tool as well as the greater demands on the automated control system to perform the operation with the cluster tool. Further, conventional cluster tools suffer an inherent throughput penalty arising from the time spent in moving wafers to and from different tool chambers or modules (i.e. different destinations) when loading and unloading the tool. By comparison, in a non-cluster tool the movement of wafers is but to and from a single chamber or module (i.e. a common destination) when loading and unloading the tool, thereby eliminating repositioning of the transport apparatus for different transport paths with a commensurate reduction in transport times. The present invention overcomes the problems of conventional tools as will be described in greater detail below with reference to exemplary embodiments.

SUMMARY

In one embodiment, a substrate bonding apparatus comprises a frame and a platen connected to the frame. The platen is adapted for supporting thereon at least one stack of substrates. A press is movably connected to the frame, the frame being movable relative to the platen for pressing the at least one stack between the press and the platen. A compliant member is disposed between the press and platen so that the press pressing the at least one stack presses the compliant member against the at least one stack.

In another embodiment, a substrate bonding apparatus comprises a frame and a platen connected to the frame, the platen being adapted for supporting thereon at least one stack of substrates. A press is movably connected to the frame, the press being movable relative to the platen for pressing the at least one substrate stack between the press and the platen. The apparatus further comprises a substrate carrier adapted for holding and carrying more than one substrate stack in and out of the apparatus, the substrate carrier being separably connectable to at least one of the platen or the press to position the more than one substrate stack between the press and platen so that the press and platen substantially simultaneously press the more than one substrate stack to effect bonding between substrates of each of the more than one substrate stack substantially simultaneously.

In yet another embodiment, a method for bonding substrates comprises providing a substrate bonding apparatus with a platen and a press movable relative to each other. The method further comprises positioning multiple substrate stacks in the apparatus between the platen and the press. The method still further comprises providing a consumable member and placing the consumable member between the platen and press so that the consumable member is seated against more than one of the multiple substrate stacks. And, the method further comprises pressing the multiple substrate stacks with the press wherein pressing presses the consumable member against the more than one of the substrate stacks to effect substantially simultaneous bonding between stacked substrates of each of the more than one substrate stacks.

BRIEF DESCRIPTION OF THE DRAWINGS

The foregoing aspects and other features of the present invention are explained in the following description, taken in connection with the accompanying drawings, wherein.

DETAILED DESCRIPTION

Figure 1:
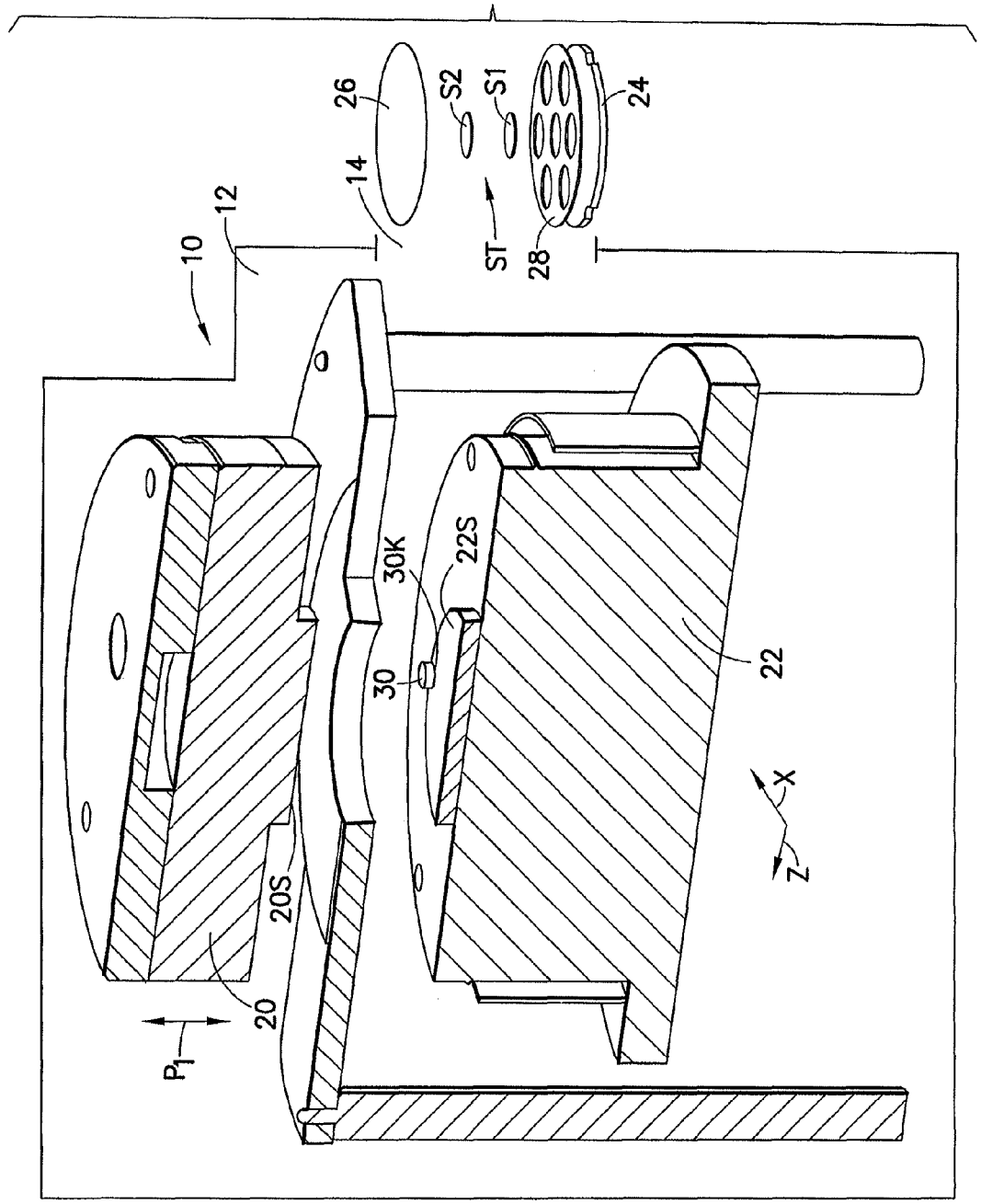
FIG. 1 is an exploded partial perspective view of a processing tool incorporating features in accordance with an exemplary embodiment of the present invention, and two wafers S1, S2.

In the embodiment shown in FIG. 1, the tool 10 is illustrated as a bond tool for example purposes, though the features of present invention as will be described below with specific reference to the exemplary embodiments are equally applicable to other semiconductor substrate and flat panel processing tools. Although the present invention will be described with reference to the embodiment shown in the drawings, it should be understood that the present invention can be embodied in many alternate forms and embodiments. In addition, any suitable size, shape or type of elements or materials could be used.

The bond tool 10, operates generally as a clamp. The tool 10 may have opposing clamping blocks, in this embodiment an upper pressure head or press 20 and opposing lower pressure block or platen 22. The tool 10 has a carrier section 24, a pressure applicator section 26 and an alignment section 28. The carrier section 24, pressure applicator section 26 and alignment section 28 may be placed as a sandwich stack (i.e. the alignment section sandwiched between the carrier section and pressure applicator section) between the opposing pressure head 20 and pressure block 22. The carrier section 24 may be position or otherwise placed on the lower pressure block 22. The pressure applicator section 26 may be disposed against the upper pressure head 20. Multiple stacks of wafers (only one set of wafers S1, S2 forming on stack ST1 is shown in FIG. 1 for example purposes) may be positioned in the wafer alignment section 28. The upper pressure head 20 and the lower pressure block 22 are moved together to apply suitable bonding pressure on the multiple wafer stacks, similar to stack ST, and effect bonding between interfacing wafers, similar to wafers S1, S2, in each stack bonding pressure on the multiple stacks is simultaneously delivered by the carrier section 24 and pressure applicator section 26 the pressure applicator section provides a substantially uniform pressure distribution on all wafer stacks being pressed in the tool 10 regardless of variances in height of different stacks as will be described in greater detail below.

The wafers or substrates S1, S2 may be of any suitable type. For example, the substrates S, S2 may be 200 mm, or 300 mm diameter semiconductor substrates, or other type of flat panel such as flat panels for display screens. In the embodiment shown, the wafers S1, S2 are substantially similar to each other. In alternate embodiments, the stack ST may comprise different types of wafers. Stack ST is shown in FIG. 1 as having two wafers S1, S2 for example purposes. As may be realized, stack ST may include any desired number of wafers being bonded together.

Still referring to FIG. 1, and in greater detail, bond tool 10 may include a chamber or housing 12. The chamber 12 may be closed or otherwise configured to have a controlled atmosphere, such as an inert gas, or may be held in vacuum conditions. In alternate embodiments, the tool may not include a chamber. As seen in FIG. 1, the chamber 12 may include an access port 14. The port 14 may have a door for closing the port if desired. The access port 14 may be sized to allow placement and removal of the carrier section 24, pressure applicator section 26, wafer alignment section 28 as well as the wafers S1, S2 and/or bonded stacks into the chamber 12. A transport device (not shown), such as a transport arm or slide, that may be automated or otherwise manually operated, may be used to move the carrier section 24, applicator section 26, alignment section 28 and wafers/stacks into and out of the chamber 12. The carrier section 24, applicator section 26, alignment section 28, wafers/stacks may be moved in or out of the chamber 12 individually or together as a unit as will be described in greater detail below. As seen in FIG. 1 at least one of the upper pressure head 20 and/or the lower pressure block 22 is movably held in the chamber 12. In the embodiment shown in FIG. 1, the pressure head 20 and opposing block 22 are depicted in a vertical clamping configuration. In alternate embodiments, the opposing pressure head and pressure block may be arranged in any other desired clamping orientation (i.e. horizontally clamping). In the exemplary embodiment, the upper pressure head 20 is movable back and forth in the direction indicated by arrow P1. The head 20 may be actuated in direction P1 by any suitable means such as electrical, pneumatic or hydraulic drive (not shown). A suitable example of the bonding tool may be the SB series of bonding tools from Suss MicroTec. Accordingly, the pressure head 20, as well as the pressure block 22 and the peripheral systems supporting or effecting the function of head 20 and block 22 may be generally similar to corresponding portions of the SB series bonding tools. Movement of pressure head 20 in direction P1 may be controlled by a suitable tool controller (not shown). Stroke of the pressure head 20 may be sized as desired to generate suitable bonding pressure on the wafer stack. The pressure head 20 may have a seating surface 20S. The seating surface 20S may be oriented so that the direction of head movement P1 is substantially normal to the seating surface. The seating surface, or the head may have heat control (i.e. may be heated and/or cooled). The heat control may be provided by any suitable thermal controller (not shown).

The tool 10 may be configured to perform any desirable substrate bond process, such an anodic, eutectic, adhesive, fusion, and thermocompression bond processors for wafer to wafer bonding. Accordingly, the tool controller (not shown) may suitably control the operation parameters of the upper pressure head 20 (e.g. head/seating temperature, stroke, chamber atmosphere) in accordance with the desired bond process being performed. The seating surface is made from a suitably hard material such as SiC.

As seen in FIG. 1, the lower pressure block 22 is generally similar to the upper pressure head 20. In this embodiment, the lower block 22 may be fixed relative to chamber 12. In alternate embodiments, the pressure block may be movable relative to the chamber in the direction indicated by arrow P1 in FIG. 1 (i.e. similar but opposite to the upper pressure head). The block 22 may include thermal control. The block 22 may have a seating surface 22S for seating the carrier section 24. The seating surface 24 is aligned within a very close degree of parallelity with the plane of the seating surface 20S on the upper head 20. The block 22 may also have holding and alignment features 30 for effecting alignment and holding of the carrier section 24 on the seating surface 22S. In this embodiment, the alignment features 30 may include keys 30K (one key 30K is visible in FIG. 1) for engagement with conformal features on the carrier section as will be described further below. For example, there may be three keys 30K, equally spaced around the center of the seating surface 22S to lock the position of the carrier section 24 on the seating surface in the horizontal plane (defined by the X and Z axes). In the embodiment shown, the keys 30K may project from the seating surface. The keys 30K may be passive (i.e. are positionally fixed). In alternate embodiments the keys may provide an active grip of (may be actuated to open or close on) the carrier section 24. In other alternate embodiments, the lower pressure block may have any other suitable coupling and interface for the carrier section.

Figure 2:
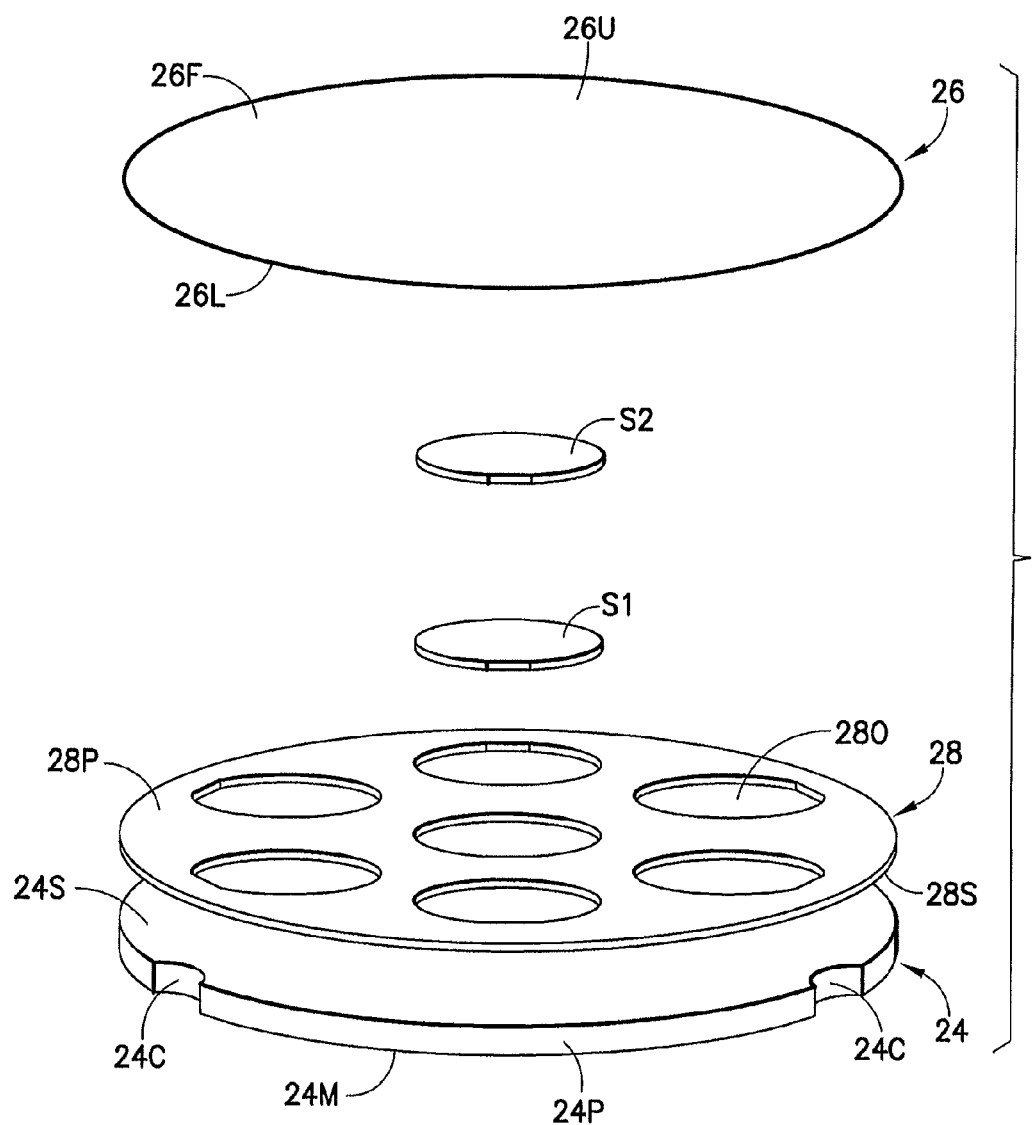
FIG. 2 is an enlarged exploded perspective view of a carrier section, wafer alignment section and pressure applicator section of the processing tool in FIG. 1 and the two wafers S1, S2.

Referring now also to FIG. 2, there is shown an enlarged perspective view of the alignment section 28, pressure applicator section 26 and carrier section 24 (as well as wafers S1, S2 for stack ST). As seen in FIG. 2, carrier section 24 may include a flat plate 24P made from a hard material such as SiC, though in alternate embodiments, any other suitable material may be used. Plate 24P may be of unitary construction or may be an assembly. The plate 24P has upper and lower surfaces 24S, 24M that are substantially parallel. The lower surface 24M of the plate forms a mating surface for mating the carrier section 24 to the seating surface 22S of the lower pressure block 22. The upper surface 24S of the plate 24P provides a seating surface for the wafer alignment section 28. The upper surface 24S in this embodiment also provides a seating surface for wafer stacks (similar to stack ST) located in the alignment section 28. In this embodiment, the carrier section 24 facilitates transport of (i.e. may be used as a carrier for) the alignment section and wafer stacks (similar to stack ST) as will be described below. In alternate embodiments, for example where the alignment section and wafer stacks may be transported, individually or together, by other carrying means into the chamber, the carrier section may be integral to the seating section of the lower pressure block. In the embodiment shown in FIGS. 1-2, the plate 24P of the carrier section 24 has a coupling 24C for coupling the carrier section 24 to the seating surface 22S. The coupling 24C may comprise complementing recesses (in this embodiment there are three recess 24C, though only two are visible in FIG. 2) for keys 30K on the seating surface 22 (see also FIG. 1). The recesses 24C are shown formed in the outer perimeter of plate 24P, and have a general scallop shape conformal to the shape of the corresponding keys 30K. When the carrier section 24 is mated to the seating surface 22S, the keys 30K are received into recesses 24C providing a positive coupling between carrier section 24 and seating surface 22. In alternate embodiments, any other desired type of coupling may be used on the carrier section to mate with the pressure block of the tool. As noted before, the upper seating surface 24S of the carrier section is sized and shaped to provide suitable seating for the wafer alignment section, as well as wafer stacks that may be located in the wafer alignment section. It is noted, that wafer stacks may not populate all stack holding locations of the alignment section. In the embodiment shown, the carrier section and wafer alignment section are shown as having a generally circular shape, though in alternate embodiments the carrier and wafer alignment section may have any other desired shape.

Figure 3:
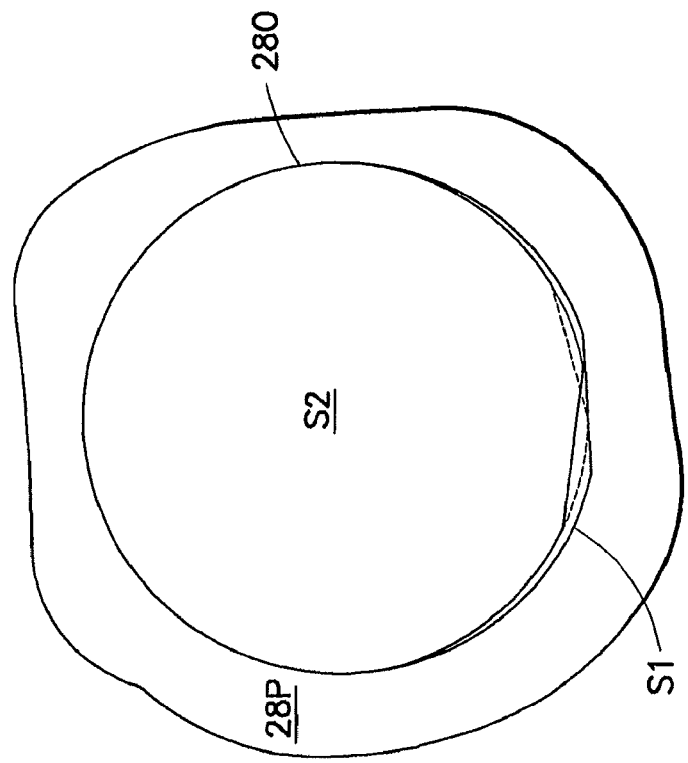
FIG. 3 is a plan view of the wafer alignment section.
Figure 4:
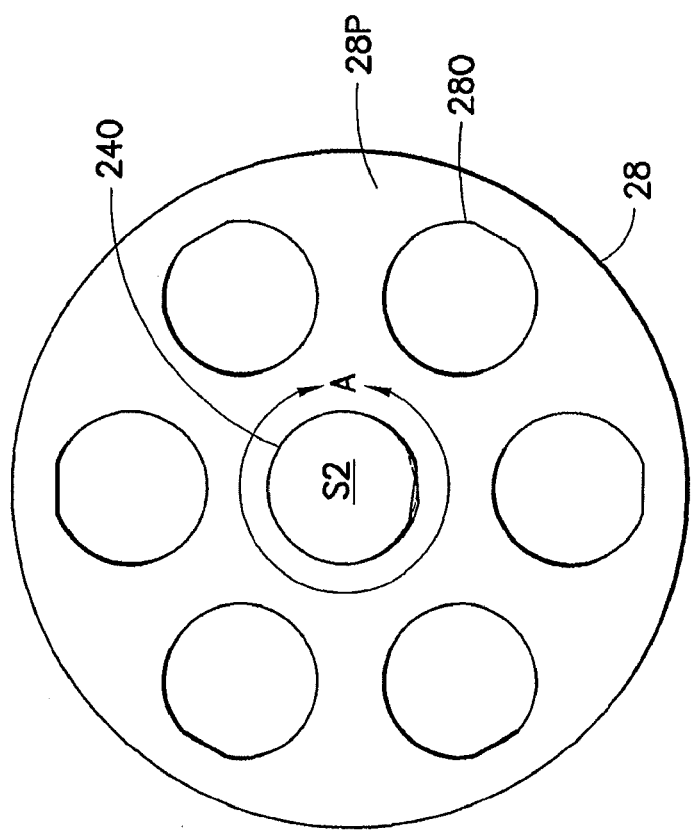
FIG. 4 is an enlarged partial view of the wafer alignment section shown in FIG. 3.

In this embodiment, the wafer alignment section 28 generally includes a plate 28P. The plate may be made from any suitable material, such as a non-reactive metal or plastic. The wafer alignment section 28 may not be subjected to compressive pressure during bonding operation, as will be seen below, and hence the plate 28P may be made from a relatively soft material. The plate 28P may be of unitary construction, though in alternate embodiments the plate may be made of multiple pieces assembled or otherwise joined together. The plate 28P may have a lower seating surface 28S for seating against the upper seating surface 24S of carrier section 24. The alignment section 28 may also include suitable coupling features (not shown) such as projecting pins mating into conformal recesses, to positively couple the alignment section 28 to the carrier section 24 during transport and bonding operation. In alternate embodiments, frictional interface may be used for coupling alignment and carrier sections. As seen in FIGS. 2, and 3-4, the plate 28P has openings 28O forming locations for holding stacked wafers, similar to wafers S1, S2 in the alignment section as will be described in greater detail below. The thickness of the plate 28P is established in order to allow sufficient pressure during bonding operation to be applied to stacked wafers, in the holding locations of the alignment section, for adequate wafer to wafer bonding to take in each stack of wafers. Hence, the thickness of the plate 28P is dependent on wafer stack height as well as any deflection or yield in the wafer stack expected to occur during bonding. The thickness of the plate 28 P is thus set so that under lowest tolerance stack up of the wafer stack (i.e. the wafers, S1, S2 making up the wafer stack ST are as thin as SEMI standard tolerances allow, generating a short stack) the uppermost wafer surface extends sufficiently above the upper surface of plate 28P, and remains raised above the upper surface throughout the bonding operation, so that the clamping pressure from the head 20 and block 22 remains imparted on the wafer stack and not the alignment section.

FIG. 3 shows a plan view of the plate 28P of the alignment section, and FIG. 4 shows a partial plan view of the plate around one wafer stack holding location 28O. In the embodiment shown, the plate 28P has seven wafer stack holding locations formed by six equally distributed outer openings 28O, and an inner opening 24O. The shown arrangement and number of holes in plate 28P is merely exemplary. In alternate embodiments, there may be any desired number of holes providing wafer stack locations. In alternate embodiments also, the holes may be disposed in any desired arrangement such as in a row and column type of arrangement. Holes 28O are through holes, and bottom wafers (similar to wafer S1) located in the holes 28O are seated against the upper surface 24S of the carrier section plate 24P. As seen best in FIG. 4, the perimeter of the holes 28O is shaped to form a close clearance fit with the wafers S1, S2. In the exemplary embodiment, the hole perimeter may also include a flat edge that cooperates with the fiducial flat on the wafer edge of each wafer to align the wafers S1, S2 in the holding locations with respect to each other.

Referring now back to FIG. 2, the pressure applicator section 26 generally comprises a foil 26F capable of transmitting and evenly distributing desired pressure from the upper pressure head 20 onto the wafer stacks (similar to stack ST) disposed in the alignment section 28 when located between head 20 and block 22, regardless of the number and spacing of the stack as well as the height variance of the stacks relative to each other. In this embodiment, the foil 26F may be made from graphite, or polymer material, or any other desired material, and may be a one piece member of unitary construction. In alternate embodiments, the foil of the pressure applicator section may be made of any other suitable compliant material that has a substantially flat compression modulus (i.e. pressure is substantially constant as compression deflection/deformation increases). As seen in FIG. 2, the foil 26F is sized to cover the wafer stacks in all the location holes of the alignment section. Upper surface 26U of the foil is disposed to seat against seating surface 20S of the head 20. The lower surface 26L may bare directly against the uppermost surface of the wafer stack. In alternate embodiments, the pressure applicator section 26 may include a shield foil 14 (not shown) non reactive material (for example a gold foil) that would be positioned between foil 26F and the wafer stack tops to control particulate from being deposited on the wafers.

Referring now again to FIG. 1, in this embodiment, the wafer alignment section 28 may be placed on the carrier section 24, and the wafers S1, S2 may be loaded into the alignment section 28, to form stacks ST in the desired number of locations, when the carrier section 24 is located outside the chamber. The foil 26F may then be positioned over the wafer stacks in the alignment section, and the carrier section 24, carrying the alignment section, wafer stacks and pressure applicator section borne as a unit into the chamber. In alternate embodiments, the pressure applicator section and foil may be positioned over the wafer stacks after the carrier section and wafer stacks are placed in the chamber. The carrier section 24 may be coupled to the seating surface 22S of the block 22, as described before. In alternate embodiments, the pressure applicator section may be positioned on seating surface 20S independent from transport of carrier section 24 into the chamber. When the carrier section is seated, the upper head is actuated to press the pressure applicator section 26 against the wafer stacks in alignment section 28, compressing the wafer stacks between pressure applicator 26 and seating surface of carrier section 24. As noted before, the pressure applicator section 26 delivers, via compliant foil 26F in this embodiment, substantially even pressure distribution across all wafer stacks ST in the alignment section, to provide substantially simultaneous wafer to wafer bonding in each of the multiple wafer stacks. Upon completion of the bonding operation, the bonded stacks may be removed, for example by removal of the carrier section 24 with the stacks, alignment section 28, and foil 26F as a unit. As may be realized, foil 26F may be consumable and may be discarded after the bonding operation if desired. The wafer stacks may be removed from the alignment section and carrier section, new wafer stacks may then be seated on the carrier section and within the alignment section, and a new foil 26F positioned over the stacks for a subsequent bonding process.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A semiconductor substrate bonding apparatus comprising:
   a frame;
   a platen connected to the frame, the platen being adapted for supporting thereon more than one stack of semiconductor substrates supported thereon;
   a press movably connected to the frame, the press being movable relative to the platen for pressing and bonding stacked substrates in each of the more than one substrate stack between the press and platen; and
   a consumable compliant member disposed between the press and platen and arranged so that the member covers substantially in entirety a face defined by the stack perimeter of each stack of the more than one semiconductor substrate stack so that the press pressing the more than one substrate stack presses the consumable compliant member-against each stack of the more than one substrate stack to effect bonding between substrates in each stack of the more than one substrate stack and effecting a substantially uniform pressure distribution on the full face of each stack of the more than one substrate stack.

2. The apparatus of claim 1, further comprising an alignment member adapted to substantially simultaneously align stacked substrates of each of the more than one substrate stacks, the alignment member maintaining the alignment during simultaneous transport of the more than one substrate stacks into the apparatus and during the simultaneous pressing of the more than one substrate stacks with the press.

3. The apparatus of claim 2, wherein the alignment member is of unitary construction.

4. The apparatus of claim 3, wherein the alignment member is a plate having multiple through-holes therein for holding the more than one substrate stacks in close-clearance fit to the plate.

5. The apparatus of claim 2, wherein the compliant member is adapted to conform to variations in height of the more than one substrate stacks, to distribute pressure substantially evenly among the more than one substrate stacks pressed by the press.

6. The apparatus of claim 5, wherein the compliant member comprises a graphite foil.

7. The apparatus of claim 2, further comprising a chamber for holding an isolated atmosphere, wherein the chamber is adapted to contain the more than one substrate stacks when the more than one substrate stacks are simultaneously pressed by the press.

8. The apparatus of claim 7, wherein the chamber is a vacuum chamber.

9. The apparatus of claim 1, further comprising a carrier adapted to support the more than one substrate stacks during transport into and out of the apparatus, and disposed between the press and platen so that the press pressing the more than one substrate stack presses the carrier against the platen.

10. The apparatus of claim 9, wherein the platen is adapted to support the carrier, and wherein the carrier is removable from the platen to allow loading and unloading of substrates from the carrier.

11. The apparatus of claim 9, wherein the carrier has a coupling for coupling with the platen and retaining the carrier on the platen.

12. The apparatus of claim 9, wherein the carrier comprises an aligner adapted to substantially simultaneously align stacked substrates of each of the more than one substrate stacks, the aligner maintaining the alignment during simultaneous transport of the more than one substrate stacks into the apparatus and the simultaneous pressing of the more than one substrate stacks with the press.

13. The apparatus of claim 9, wherein the carrier comprises a carrier plate, and wherein the aligner is removably mounted to the carrier plate.

14. The apparatus of claim 12, wherein the aligner is disposed between the press and platen when pressing the more than one substrate stacks with the press, and wherein the aligner is sized and shaped so that the more than one substrate stack is pressed between the press and the platen to effect substrate bonding without compressing the aligner.

15. A semiconductor substrate bonding apparatus comprising:
    a frame;
    a platen connected to the frame, the platen being adapted for supporting thereon at least one stack of semiconductor substrates;
    a press movably connected to the frame, the press being movable relative to the platen for pressing and bending the stacked substrates of the at least one semiconductor substrate stack between the press and the platen; and
    a substrate carrier adapted for holding and carrying more than one semiconductor substrate stack separated from and along side of each other in and out of the apparatus, the substrate carrier being separably connectable to at least one of the platen or the press to position the more than one substrate stack between the press and platen so that the press and platen substantially simultaneously press the more than one substrate stack to effect bonding between substrates of each of the more than one substrate stack substantially simultaneously and effecting a substantially uniform pressure distribution on the more than one substrate stack regardless of variations in height between the more than one substrate stack.

16. The apparatus of claim 15, wherein the carrier has a first surface disposed to be seated against at least one of the platen or the press, and has a second surface that presses the more than one substrate stack to effect substrate bonding.

17. The apparatus of claim 16, wherein the second surface is disposed between the platen and press so that the second surface presses the more than one substrate stack to effect substrate bonding when the press and platen press the more than one substrate stack.

18. The apparatus of claim 15, wherein the carrier comprises a carrier plate, and an alignment member connected to the carrier plate and adapted to align stacked substrates of each of the more than one substrate stack.

19. The apparatus of claim 18, wherein the carrier comprises a consumable member connected to the carrier plate and disposed so that the consumable member is pressed against the more than one substrate stack by the press and platen pressing the more than one substrate stack to effect substrate bonding.

20. The apparatus of claim 15, further comprising a consumable member separably connectable to at least one of the platen or the press and disposed so that the consumable member is pressed against the more than one substrate stack by the press and platen pressing the more than one substrate stack to effect substrate bonding.

21. The apparatus of claim 20, wherein the consumable member is a compliant member made of graphite or polymer material.

22. The apparatus of claim 15, wherein the substrate carrier comprises an aligner disposed between the press and platen when pressing the more than one substrate stacks with the press, and wherein the aligner is sized and shaped so that the more than one substrate stack is pressed between the press and the platen to effect substrate bonding without compressing the aligner.

23. The apparatus of claim 1 wherein the consumable compliant member pressed against each stack effects a substantially uniform pressure distribution regardless of variations in height between the more than one substrate stack, the compliant member being compliant with respect to the variations in height between the more than one substrate stack while transmitting the substantially uniform pressure distribution to each stack of the more than one substrate stack.

\* \* \* \* \*